3,511,837
4-PYRIMIDYL-1,4-DIHYDROPYRIDINE DERIVATIVES AND THEIR PRODUCTION

Friedrich Bossert, Wuppertal-Elberfeld, and Wulf Vater, Opladen, Germany, assignors to Farbenfabriken Bayer Aktiengesellschaft, Leverkusen, Germany, a corporation of Germany
No Drawing. Filed Mar. 14, 1968, Ser. No. 712,911
Claims priority, application Germany, Mar. 20, 1967, F 51,880
Int. Cl. C07d 51/36
U.S. Cl. 260—256.4   10 Claims

ABSTRACT OF THE DISCLOSURE 4-pyrimidyl-1,4-dihydropyridine derivatives of the formula:

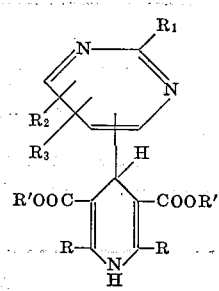

wherein R is hydrogen or alkyl of 1 to 3 carbon atoms, R' is alkyl of 1 to 4 carbon atoms, alkyl of 1 to 6 carbon atoms interrupted by one or more oxygen atoms or substituted by hydroxyl, or alkylene of 1 to 6 carbon atoms interrupted by one or more oxygen atoms or substituted by hydroxyl, $R_1$ is hydrogen, lower alkyl or lower alkylamino, and $R_2$ and $R_3$ are hydrogen or lower alkoxy, are produced by reacting pyrimidine-aldehydes or substituted pyrimidine-aldehydes with acyl fatty acid esters of the formula R—CO—CH$_2$—COOR', wherein R and R' are as above defined with ammonia. These compounds have been found to be particularly effective in the treatment of disturbances of the coronary blood supply and in particular in the treatment of angina pectoris.

---

The present invention is concerned with 4-pyrimidyl-1,4-dihydropyridine derivatives of the formula:

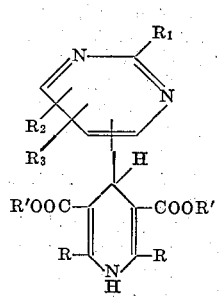

wherein
R is hydrogen or alkyl of 1 to 3 carbon atoms,
R' is alkyl of 1 to 4 carbon atoms, alkyl of 1 to 6 carbon atoms interrupted by one or more oxygen atoms or substituted by hydroxyl, or alkylene of 1 to 6 carbon atoms interrupted by one or more oxygen atoms or substituted by hydroxyl,
$R_1$ is hydrogen, lower alkyl or lower alkylamino, and $R_2$ and $R_3$ are hydrogen or lower alkoxy.

Therapeutic compounds useful for the disturbances of the coronary blood supply have assumed increased importance. The commercially available preparations have not always shown satisfactory results in the coronary insufficiency and in particular in the treatment of angina pectoris. In most cases nitrites are still used their activity being based on a relief of the heart. The 4-pyrimidyl-1,4-dihydropyridine derivatives above described when administered intravenously or perorally produce a marked and long-lasting coronary dilation which effects are superior to all known commercially available products with regard to the duration of effectiveness. In animal experiments the coronary action is favorably supported by simultaneously present nitrite-like effects.

The 4-pyrimidyl-1,4-dihydropyridine derivatives of the present invention are produced by reacting pyrimidine-aldehydes or pyrimidine-aldehydes substituted by one or more lower alkyl, lower alkylamino or lower alkoxy moieties with acyl fatty acid esters of the formula R—CO—CH$_2$—COOR', wherein R is hydrogen or alkyl of 1–3 carbon atoms and R' is alkyl of 1–4 carbon atoms, alkyl of 1–6 carbon atoms interrupted by one or more oxygen atoms or substituted by hydroxyl or alkylene of 1–6 carbon atoms interrupted by one or more oxygen atoms or substituted by hydroxyl, with ammonia in the presence of an organic solvent such as methanol or ethanol. Pyrimidine-aldehydes are 4(6)- or 5-pyrimidine-aldehydes.

These compounds are used as such or in the form of their salts formed with nontoxic, organic or inorganic acids.

The following nonlimitative examples illustrate the production of the compounds according to the present invention.

EXAMPLE 1

4-(4',6'-dimethoxy-5'-pyrimidyl)-2,6-dimethyl-3,5-dicarboxylic acid ethyl ester-1,4-dihydropyridine 17 g. 4,6-dimethoxypyrimidine-5-aldehyde, 27 cc. acetoacetic acid ethyl ester and 11 cc. ammonia are heated under reflux in 50 cc. alcohol for 8 hours, the product is filtered off with suction, washed with alcohol and 31 g. (residue and filtrate) of M.P. 240° C. are obtained.

The corresponding isopropyl ester melts at 148 to 140° C.

EXAMPLE 2

4-(2'-dimethylamino - 4' - methoxy-5'-pyrimidyl)-2,6-dimethyl-3,5-dicarboxylic acid ethyl ester-1,4-dihydropyridine After boiling for 4 hours 5 g. 2-dimethylamino-4-methoxy-pyridine-5-aldehyde (B.P. 120 to 145° C./0.3 mm. Hg) with 10 cc. acetoacetic acid ethyl ester and 4 cc. ammonia in 15 cc. alcohol, there are obtained, after filtration and concentration, 8 g. of pale yellow crystals of M.P. 195° C.

EXAMPLE 3

4-(5'-pyrimidyl)-2,6-dimethyl-3,5-dicarboxylic acid ethyl ester-1,4-dihydropyridine 12 g. pyrimidine-5-aldehyde, 28 cc. acetoacetic acid ethyl ester, 40 cc. alcohol and 11 cc. ammonia are heated under reflux for 3 hours. The mixture is filtered off and cooled, the product filtered off with suction and there are obtained 17 g. of almost colorless crystals of M.P. 206 to 207° C., and by concentrating the filtrate a further 5 g. of the same melting point: Isopropyl ester of M.P. 235° C.; β-methoxy ethyl ester of M.P. 153° C.

EXAMPLE 4

4-(5'-pyrimidyl)-2,6-dimethyl-3,5-dicarboxylic acid-β-hydroxyethyl ester-1,4-dihydropyridine After heating for 8 hours 5 g. pyrimidine-5-aldehyde, 18 g. acetoacetic acid-β-hydroxyethyl ester (B.P. 112 to 115° C./0.15 mm. Hg) and 5.5 cc. ammonia in 20 cc. alcohol, the mixture is filtered off, the alcohol distilled off and the residue recrystallized from acetone: 14 g. yellow crystals of M.P. 207 to 209° C.

By the same method there are obtained from 4,6-dimethoxy-pyrimidine-5-aldehyde, yellow crystals of M.P. 199 to 201° C.

EXAMPLE 5

4-(2'-dimethylamino-5'-pyrimidyl)-2,6-dimethyl-3,5-dicarboxylic acid-isopropyl ester-1,4-dihydropyridine 5 g. 2 - dimethylaminopyrimidine - 5 - aldehyde (B.P. 100° C./0.4 mm. Hg) are heated with 10 g. acetoacetic acid isopropyl ester and 4 cc. ammonia in 15 cc. alcohol at the boil for several hours; the solution is filtered and cooled, and there are obtained 9 g. of white crystals of M.P. 176 to 178° C. The melting point of the corresponding ethyl ester is 198° C.

EXAMPLE 6

4 - (2' - methylamino - 4',6' - dimethoxy - 5' - pyrimidyl)-2,6-dimethyl-3,5-dicarboxylic acid ethyl ester-1,4-dihydropyridine After boiling for several hours 16 g. 2-methylamino-4,6 - dimethoxy - pyrimidine - 5 - aldehyde (M.P. 145 to 148° C.), 26 cc. acetoacetic acid ethyl ester and 11 cc. ammonia in 20 cc. alcohol, the mixture is filtered off and the solution mixed with a little ether. After cooling, pale yellow crystals of M.P. 208 to 210° C. are obtained.

EXAMPLE 7

4-(4',6'-dimethoxy-5'-pyrimidyl)-2,6-dimethyl-3,5-dicarboxylic acid-β-methoxyethyl ester-1,4-dihydropyridine 16 g. 4,6 - dimethoxypyrimidine - 5 - aldehyde, 32 g. acetoacetic acid-β-methoxyethyl ester (B.P. 90° C./3 mm. Hg) and 11 cc. ammonia in 40 cc. alcohol are heated under reflux for 6 hours. After filtering off the solution, it is mixed with petroleum ether and there are obtained 43 g. of yellow crystals which are recrystallized from benzene/ligroin; M.P. 145 to 148° C.

EXAMPLE 8

4-(4'-pyrimidyl)-2,6-dimethyl-3,5-dicarboxylic acid isopropyl ester-1,4-dihydropyridine 5 g. pyrimidine-4-aldehyde are heated in 15 cc. acetoacetic acid isopropyl ester and 5.5 cc. ammonia in 25 cc. methanol at boiling temperature for 5 hours; the solution is filtered, cooled and, after suction-filtration and washing with ether, 7 g. of pale brown crystals of M.P. 199–201° C. are obtained.

The compound obtained in the same manner with acetoacetic acid ethyl ester in ethanol melts at 186–188° C. (HCl salt).

| Compound of— | Coronary activity on dogs (mg./kg. i.v.) |
|---|---|
| Example 1: | |
| 4-(4', 6'-dimethoxy-5'-primidyl)-2, 6-dimethyl-3, 5-dicarboxylic acid ethylester-, 14-dihydropyridine. | 0.2–0.5 |
| 4-(4', 6'-dimethoxy-5'-pyrimidyl)-2, 6-dimethyl-3, 5-dicarboxylic acid-isopropylester-1, 4-dihydropyridine. | 0.5–1.0 |
| Example 2—4-(2'-dimethylamino-4'-methoxy-5'-pyrimidyl)-2, 6-dimethyl-3, 5-dicarboxylic acid ethylester-1, 4-dihydropyridine. | 1.0 |
| Example 3: | |
| 4-(5'-pyrimidyl)-2, 6-dimethyl-3, 5-dicarboxylic acid ethyl-ester-1, 4-dihydropyridine. | 2.0 |
| 4-(5'-pyrimidyl)-2, 6-dimethyl-3, 5-dicarboxylic acid isopropyl-ester-1, 4-dihydropyridine. | 1.0 |
| 4-(5'-pyrimidyl-)-2, 6-dimethyl-3, 5-dicarboxylic acid-β-methoxy-ethylester. | 3.0 |
| Example 4—4-(5'-pyrimidyl)-2, 6-dimethyl-3, 5-dicarboxylic acid-β-hydroxy-ethyl-ester-1, 4-dihydropyridine. | 10.0 |
| Example 5—4-(2'-dimethylamino-5'-pyrimidyl)-2, 6-dimethyl-3, 5-dicarboxylic acid-isopropylester-1, 4-dihydropyridine. | 3.0 |
| Example 6—4-(2'-methylamino-4', 6'-dimethoxy-5'-pyrimidyl)-2, 6-dimethyl-3, 5-dicarboxylic acid ethylester-1, 4-dihydropyridine. | 10.0 |
| Example 7—4-(4', 6'-dimethoxy-5'-pyrimidyl)-2, 6-dimethyl-3, 5-dicarboxylic acid-β-methoxy ethylester-1, 4-dihydropyridine. | 2.0 |
| Example 8—4-(4'-pyrimidyl)-2, 6-dimethyl-3, 5-dicarboxylic acid-isopropyl-ester-1, 4-dihydropyridine. | 1.0 |

The coronary-active compounds can be applied intravenously, orally, intramuscularly, but also in form of suppositories. The ampoules, capsules, sugar-coated pills, tablets, suppositories and the like, which are contemplated for application, generally contain approximately the following quantities; these quantities are listed below for ampoules and capsules by way of example for some compounds:

| Compound of— | Ampoules (mg.) | Capsules (mg.) (approx.) |
|---|---|---|
| Example 1: | | |
| 4-(4', 6'-dimethoxy-5'-pyrimidyl)-2, 6-dimethyl-3, 5-dicarboxylic acid ethylester-1, 4-dihydropyridine. | 2.5–10.0 | 25.0 |
| 4-(4', 6'-dimethoxy-5'pyrimidyl)-2, 6-dimethyl-3, 5-dicarboxylic acid isopropyl-ester-1, 4-dihydropyridine. | 2.5–10.0 | 25.0 |
| Example 2—4-(2'-dimethylamino-4'-methoxy-5'-pyrimidyl)-2, 6-dimethyl-3, 5-dicarboxylic acid ethylester-1, 4-dihydropyridine. | 5.0–15.0 | 25.0 |
| Example 3: | | |
| 4-(5'-pyrimidyl)-2, 6-dimethyl-3, 5-dicarboxylic acid ethyl-ester-1, 4-dihydropyridine. | 10.0–20.0 | 50.0 |
| 4-(5'-pyrimidyl)-2, 6-dimethyl-3, 5-dicarboxylic acid isopropyl-ester-1, 4-dihydropyridine. | 5.0–15.0 | 25.0 |

For the application in human medicine in the treatment of angina pectoris 1 to 2 ampoules are to be used per day; when the compound is administered in capsules, sugar-coated pills or tablets, 3 doses should be applied per day. The aforesaid quantities refer to persons having a body weight of about 70 kg. The application of suppositories can be varied correspondingly. Nevertheless, it may be required to apply larger or lesser quantities in depedence on the body weight, the mode of application, but also on the reaction of the individual patient to the medicament and the kind of formulation thereof as well as the date and interval of administration. Thus, it may be quite sufficient in some cases to administer less than the above-said minimum dosage, whereas the upper limit has to be exceeded in other cases. If larger doses are administered, it may be expedient to distribute same in several single doses during a day.

The coronary-active compounds being obvious from the disclosure and the examples, respectively, can be applied both for the treatment of an angina pectoris attack and for the prophylactic treatment of angina pectoris.

What is claimed is:
1. 4-pyrimidyl-1,4-dihydropyridine derivatives of the formula:

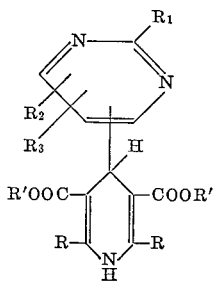

wherein
R is hydrogen or alkyl of 1 to 3 carbon atoms,
R' is alkyl of 1 to 4 carbon atoms, alkyl of 1 to 6 carbon atoms interrupted by one or more oxygen atoms or substituted by hydroxyl, or alkylene of 1 to 6 carbon atoms interrupted by one or more oxygen atoms or substituted by hydroxyl,
$R_1$ is hydrogen, lower alkyl or lower alkylamino, and
$R_2$ and $R_3$ are hydrogen or lower alkoxy.

2. A compound according to claim 1 wherein the pyrimidyl moiety is linked to the 4-position of the pyridine moiety at the 5'-position.

3. The compound according to claim 1 which is 4-(4',6'-dimethoxy - 5' - pyrimidyl)-2,6-dimethyl - 3,5-dicarboxylic acid ethyl ester-1,4-dihydropyridine.

4. The compound according to claim 1 which is 4-(2' - dimethylamino-4'-methoxy-5'-pyrimidyl) - 2,6 - dimethyl-3,5-dicarboxylic acid ethyl ester-1,4-dihydropyridine.

5. The compound according to claim 1 which is 4-(5'-pyrimidyl)-2,6-dimethyl - 3,5 - dicarboxylic acid ethyl ester-1,4-dihydropyridine.

6. The compound according to claim 1 which is 4-(5'-pyrimidyl) - 2,6 - dimethyl - 3,5 - dicarboxylic acid-β-hydroxyethyl ester-1,4-dihydropyridine.

7. The compound according to claim 1 which is 4-(2'-dimethylamino-5'-pyrimidyl) - 2,6 - dimethyl - 3,5 - dicarboxylic acid-isopropyl ester-1,4-dihydopyridine.

8. The compound according to claim 1 which is 4-(2'-methylamino - 4',6' - dimethoxy-5'-pyrimidyl) - 2,6-dimethyl-3,5-dicarboxylic acid ethyl ester-1,4-dihydropyridine.

9. The compound according to claim 1 which is 4-(4',6'-dimethoxy - 5' - pyrimidyl) - 2,6 - dimethyl-3,5-dicarboxylic acid-β-methoxyethyl ester-1,4-dihydropyridine.

10. The compound according to claim 1 which is 4-(4'-pyrimidyl)-2,6-dimethyl - 3,5 - dicarboxylic acid isopropyl ester-1,4-dihydropyridine.

References Cited

Klingsberg (ed.): "Pyridine and Its Derivatives, Part One," Interscience, 1960, pp. 500–503.

ALEX MAZEL, Primary Examiner

R. J. GALLAGHER, Assistant Examiner

U.S. Cl. X.R.
424—251